(12) United States Patent
Razzaghi

(10) Patent No.: US 10,081,228 B2
(45) Date of Patent: Sep. 25, 2018

(54) CAR VISOR

(71) Applicant: Mahmoud Razzaghi, Franklin, TN (US)

(72) Inventor: Mahmoud Razzaghi, Franklin, TN (US)

( * ) Notice: Subject to any disclaimer, the term of this patent is extended or adjusted under 35 U.S.C. 154(b) by 0 days.

(21) Appl. No.: 15/346,222

(22) Filed: Nov. 8, 2016

(65) Prior Publication Data

US 2018/0126827 A1    May 10, 2018

(51) Int. Cl.
*B60J 3/00* (2006.01)
*B60J 3/02* (2006.01)

(52) U.S. Cl.
CPC ............ *B60J 3/023* (2013.01); *B60J 3/0226* (2013.01); *B60J 3/0286* (2013.01)

(58) Field of Classification Search
CPC ...... B60J 3/0265; B60J 3/0252; B60J 3/0239; B60J 3/0208; B60J 3/0204; B60J 3/0221; A61F 9/045; B29C 66/71; B32B 2367/00
USPC ...... 296/97.2, 97.1, 97.12, 97.13, 97.9, 97.8
See application file for complete search history.

(56) References Cited

U.S. PATENT DOCUMENTS

| | | | | |
|---|---|---|---|---|
| 3,580,619 A | * | 5/1971 | Maltais | F16D 1/0835 292/349 |
| 4,130,317 A | * | 12/1978 | Lai | B60J 3/0273 24/327 |
| 4,417,761 A | * | 11/1983 | Cziptschirsch | B60J 3/0265 296/97.9 |
| 4,428,612 A | * | 1/1984 | Viertel | B60J 3/0265 24/543 |
| 4,489,974 A | * | 12/1984 | Warhol | B60J 3/0265 16/337 |
| 4,582,356 A | * | 4/1986 | Kaiser | B60J 3/0252 248/291.1 |
| 4,600,234 A | * | 7/1986 | Jonsas | B60J 3/0265 296/97.1 |
| 4,610,443 A | * | 9/1986 | Ebert | B60J 3/0265 264/278 |
| 4,617,699 A | * | 10/1986 | Nakamura | B60J 3/0252 16/262 |
| 4,734,955 A | * | 4/1988 | Connor | B60J 3/0265 16/332 |
| 4,763,946 A | * | 8/1988 | Robbins | B60J 3/0278 296/97.1 |
| 4,841,599 A | * | 6/1989 | Cebollero | B60J 3/0265 16/297 |
| 4,902,063 A | * | 2/1990 | Crink | B60J 3/0208 296/97.11 |

(Continued)

*Primary Examiner* — Kiran B Patel

(57) ABSTRACT

A car visor having a light blocking visor sheet attached rotatably to a horizontal shaft which is secured rotatably at one end with a vertical leg above the windshield. An end shaft is fixed to the free end of the visor sheet in alignment with the horizontal shaft. A flexing receptacle attached above the windshield receives and holds the end shaft. The end shaft is partially cylindrical with larger thickness and partially flat with smaller thickness. When the visor sheet is rotated to near vertical orientation, the receptacle flexes against the thinner flat side of the end shaft, allowing the shaft to be pulled out of or pushed into the receptacle with less force compared to other visor sheet orientations where the receptacle flexes against the thicker cylindrical side of the end shaft. Therefore, the driver can maneuver the visor safely and comfortably between windshield and side window.

5 Claims, 2 Drawing Sheets

(56) References Cited

U.S. PATENT DOCUMENTS

| | | | | |
|---|---|---|---|---|
| 4,944,549 A * | 7/1990 | Hilbert | B60J 3/023 | 296/97.1 |
| 4,953,064 A * | 8/1990 | Viertel | B60J 3/023 | 296/97.5 |
| 5,007,622 A * | 4/1991 | Gabas | B60J 3/0265 | 16/342 |
| 5,011,211 A * | 4/1991 | Svensson | B60J 3/0282 | 296/97.1 |
| 5,011,212 A * | 4/1991 | Viertel | B60J 3/0204 | 160/370.21 |
| 5,026,108 A * | 6/1991 | Leahy | B60J 3/0204 | 296/97.11 |
| 5,052,078 A * | 10/1991 | Hosoi | G06F 1/1616 | 16/297 |
| 5,107,569 A * | 4/1992 | Hughes | B60J 3/0213 | 16/2.1 |
| 5,139,303 A * | 8/1992 | Miller | B60J 3/0265 | 296/97.12 |
| 5,205,639 A * | 4/1993 | White | B60J 3/0278 | 296/97.2 |
| 5,251,949 A * | 10/1993 | Miller | B60J 3/0265 | 16/297 |
| 5,338,083 A * | 8/1994 | Gute | B60J 3/0265 | 296/97.12 |
| 5,383,700 A * | 1/1995 | Agro | B60J 3/0252 | 296/97.12 |
| 5,449,215 A * | 9/1995 | Viertel | B60J 3/0265 | 264/279.1 |
| 5,454,617 A * | 10/1995 | Welter | B60J 3/0204 | 296/97.12 |
| 5,498,056 A * | 3/1996 | Viertel | B60J 3/0265 | 296/97.5 |
| 5,556,155 A * | 9/1996 | Welter | B60J 3/0252 | 296/97.12 |
| 5,795,010 A * | 8/1998 | Dalbard | B60J 3/0265 | 296/97.13 |
| 5,871,252 A * | 2/1999 | Gute | B60J 3/0239 | 296/97.11 |
| 5,924,748 A * | 7/1999 | Zapinski | B60J 3/0265 | 296/97.1 |
| 5,934,734 A * | 8/1999 | Wilson | B60J 3/0239 | 296/97.11 |
| 5,966,776 A * | 10/1999 | Ona | E05F 1/08 | 16/303 |
| 5,967,587 A * | 10/1999 | Collet | B60J 3/0239 | 16/342 |
| 6,264,264 B1 * | 7/2001 | Kato | B60J 3/0265 | 296/97.12 |
| 6,273,489 B1 * | 8/2001 | Viertel | B60J 3/0217 | 296/97.9 |
| 6,296,293 B1 * | 10/2001 | Peterson | B60J 3/0239 | 296/97.1 |
| 6,349,449 B1 * | 2/2002 | Kuehl | E05D 11/084 | 16/332 |
| 6,470,532 B2 * | 10/2002 | Rude | G06F 1/1616 | 16/313 |
| 6,634,696 B1 * | 10/2003 | Tiesler | B60J 3/0204 | 296/97.1 |
| 7,152,901 B2 * | 12/2006 | Kleyn | B60J 3/0204 | 296/97.1 |
| 7,171,112 B2 * | 1/2007 | Selvini | B60J 3/0239 | 296/97.11 |
| 7,823,954 B2 * | 11/2010 | Jones | B60J 3/0278 | 296/97.11 |
| 8,205,302 B2 * | 6/2012 | Wang | H04M 1/0216 | 16/342 |
| 9,033,392 B2 * | 5/2015 | Asai | B60J 3/0252 | 296/97.9 |
| 9,758,023 B2 * | 9/2017 | Aoki | B60J 3/0265 | |
| 9,834,068 B2 * | 12/2017 | Cha | B60J 3/0265 | |
| 2005/0206187 A1 * | 9/2005 | Torii | B60J 3/0252 | 296/97.13 |
| 2006/0068642 A1 * | 3/2006 | Hamaguchi | F16B 5/0642 | 439/638 |
| 2006/0175860 A1 * | 8/2006 | Umemura | B60J 3/0252 | 296/97.9 |
| 2006/0267369 A1 * | 11/2006 | Kearns | B60J 3/0265 | 296/97.12 |
| 2007/0147829 A1 * | 6/2007 | Teratani | B60R 11/04 | 396/428 |
| 2009/0134657 A1 * | 5/2009 | Asai | B60J 3/0239 | 296/97.11 |
| 2009/0200828 A1 * | 8/2009 | Welter | B60J 3/0265 | 296/97.12 |
| 2010/0001548 A1 * | 1/2010 | Okazaki | B60J 3/0239 | 296/97.2 |
| 2010/0013263 A1 * | 1/2010 | Okazaki | B60J 3/0265 | 296/97.11 |
| 2010/0019527 A1 * | 1/2010 | Asai | B60J 3/0217 | 296/97.1 |
| 2011/0260491 A1 * | 10/2011 | Ebisuoka | B60J 3/0217 | 296/97.5 |
| 2011/0260492 A1 * | 10/2011 | Ogawa | B60J 3/0239 | 296/97.11 |
| 2013/0258510 A1 * | 10/2013 | Sakata | B60R 1/06 | 359/841 |
| 2015/0165877 A1 * | 6/2015 | Cha | B60J 3/0252 | 296/97.5 |
| 2015/0165879 A1 * | 6/2015 | Cha | B60J 3/0265 | 359/844 |
| 2015/0273988 A1 * | 10/2015 | Yamazaki | B60J 3/026 | 296/97.4 |
| 2016/0193901 A1 * | 7/2016 | Nakagawa | B60J 3/0273 | 296/97.9 |
| 2016/0288626 A1 * | 10/2016 | Aoki | F16F 1/16 | |

* cited by examiner

CAR VISOR

This application has priority date of provisional patent application 62/361,425 filed 12, Jul. 2016.

FIELD OF THE INVENTION

This invention relates to car visor and driving safety.

BACKGROUND OF THE INVENTION

Car visors play a critical role in driving safety and comfort by preventing eye glare from the sun. They also provide shade at the side window. Car visor has generally a rectangular opaque visor sheet installed moveably inside the car above the windshield.

The visor sheet can rotate around a horizontal bar at its top edge. The horizontal bar has a vertical extension attached moveably to the roof of the car to allow horizontal rotation of the visor sheet toward the side window.

The visor sheet is frictionally attached to the horizontal bar with a snap mechanism that secures it above the windshield when rotated upward close to the roof of the car. The snap mechanism keeps the visor in its designated park location and prevents unintended downward rotation of the visor and blocking of the driver sight. The frictional force between the visor sheet and the horizontal bar helps to keep the visor sheet at any angular orientation set by the driver.

With the single point of pivotal attachment, the relatively long visor sheet has a cantilever geometry which makes the attachment vulnerable to positional drift and vibration. Therefore, a receptacle fixed to the roof of the car movably holds part of the horizontal bar at the free end of the visor sheet.

The receptacle also works in a snap action mode to firmly hold the end of the rod. The visor sheet can be rotated while secured with flexure force in the receptacle and can be pulled away and rotated to the side window. The receptacle provides the snap action force either through its own flexure or a spring.

To move the visor sheet to the side window, the user must rotate the visor sheet downward, pull the end out of the receptacle and then rotate the visor sheet horizontally. This pulling force is relatively high which takes excessive effort and causes substantial driver distraction in the process and increases risk of accident.

The driver distraction in pulling the visor end out of or into the receptacle cannot be eliminated by reducing the receptacle holding force as it compromises the receptacle functionality and its main purpose.

OBJECTS OF THE INVENTION

Therefore, the object of this invention is to provide a car visor and receptacle system that holds the free end of the visor firmly and at the same time allows its easy release or insertion for low risk moving of the visor to the side window and repositioning it back.

DESCRIPTION OF THE INVENTION

Figure 1:
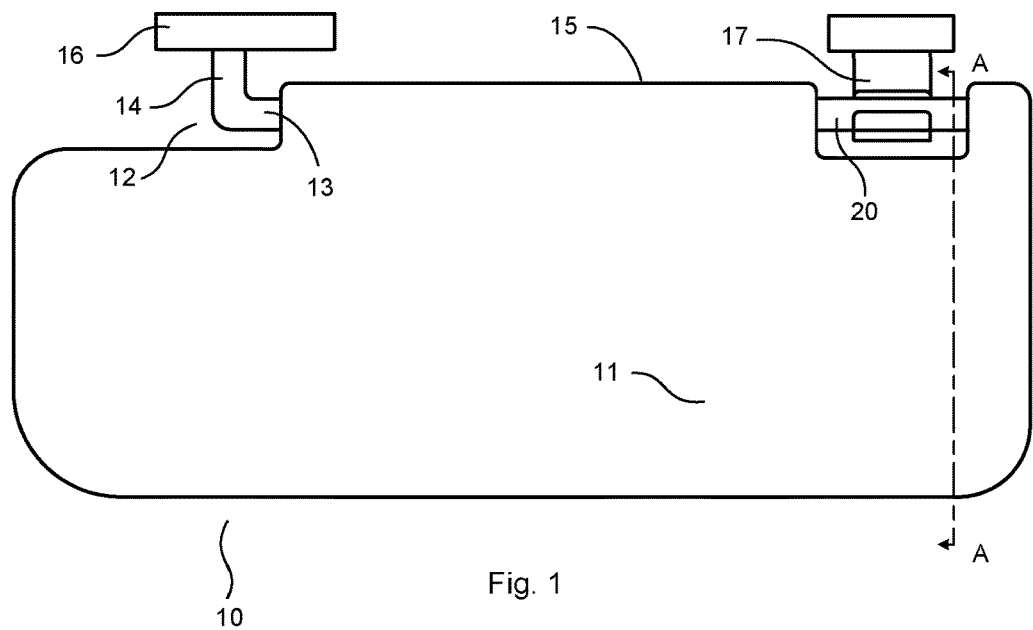
FIG. 1 shows the overall view of the car visor described in different embodiments of the invention.
Figure 2:
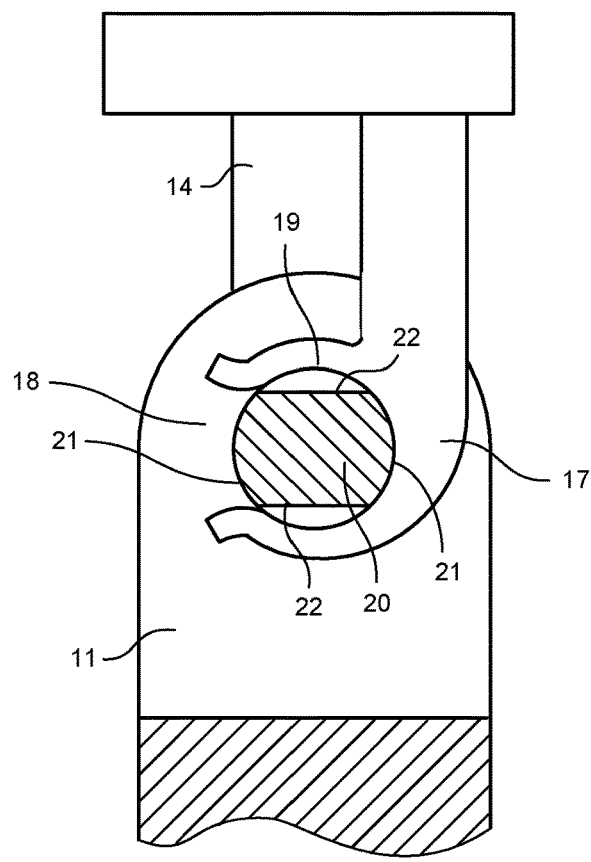
FIG. 2 shows a sectional side view of the first preferred embodiment of the invention with the visor sheet in vertical position.
Figure 3:
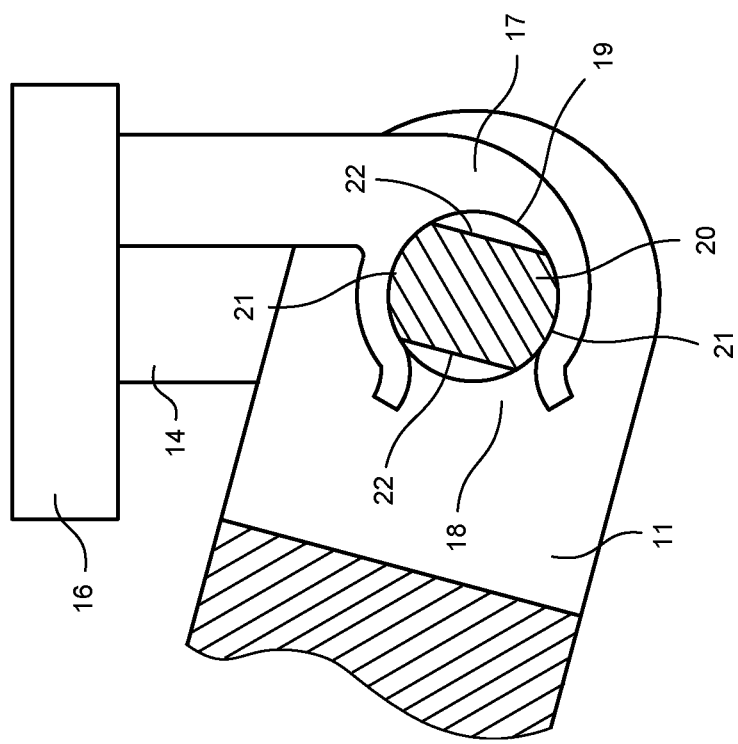
FIG. 3 shows a sectional side view of the first preferred embodiment of the invention with the visor sheet in park position.

According to FIGS. 1, 2 and 3, there is a car visor 10 having light blocking sheet 11 and L shaped rod 12 with horizontal longer side as shaft 13 and vertical shorter side as shaft 14. Shaft 13 holds sheet 11 along its top edge 15. Sheet 11 has fixed longitudinal relation with shaft 13 and frictional rotational relation around it. Shaft 14 is attached to a base 16 with fixed longitudinal relation and rotational frictional relation. Base 16 is fixedly attached above the upper corner of the windshield to the roof of the car.

A receptacle 17 with opening 18 and cavity 19 is attached to the roof of the car to movably hold end shaft 20 fixed to sheet 11. Sheet 11 is normally in park position aligned with the car roof above the windshield.

To block sun rays coming directly to the eye through the windshield, the driver holds sheet 11 and rotates it downward. The driver further rotates sheet 11 towards the windshield such that it is tilted forward away from vertical direction. Any position of sheet 11 tilted toward the driver down to vertical orientation is not comfortable or useful for the driver. The practical angular range of sheet 11 is about 30 degrees or higher from vertical toward the windshield.

To block direct sunlight from the side window, the driver rotates sheet 11 downward, pulls end shaft 20 out of receptacle 17, and then rotates sheet 11 and rod 12 around shaft 14 to the side window.

In the first embodiment of the invention, FIG. 2, end shaft 20 has a cylindrical portion 21 with larger thickness and a flat portion 22 with smaller thickness in two perpendicular radial directions.

Opening 18 and cavity 19 of receptacle 17 have dimensions that are smaller than the dimension across circular portion 21. The dimension of opening 18 is also slightly larger than the dimension across flat portions 22.

Normally, cavity 19 makes contact with thicker cylindrical portion 21 of shaft 20 and adjusts to the dimension across them through flexure. The flexure force keeps shaft 20 tightly in cavity 19 while allowing its rotation when the user applies a torque to sheet 11. The driver can comfortably rotate sheet 11 due to the large leverage provided by sheet 11 compared to the relatively small diameter of end shaft 20.

For moving sheet 11 to the side window the driver rotates it downward from its park position to a near vertical orientation so that thinner flat portion 22 aligns with opening 18 of receptacle 17. Then, the driver can pull shaft 20 out of receptacle 17 comfortably with no or minor resistance through opening 18.

During the process of rotating sheet 11 for pulling shaft 20 out of receptacle 17, shaft 20 slightly engages with opening 18 when flat portion 22 approaches alignment with opening 18. This condition provides a delicate feedback to the driver as to the right condition to pull shaft 20 out of receptacle 17.

To reposition sheet 11 to its park state from the side window, the driver holds sheet 11 in near vertical orientation and rotates it toward the windshield. Shaft 20 reaches opening 18 of receptacle 17 and flat portions 22 align approximately with opening 18. The driver continues rotating sheet 11 horizontally around shaft 14. Shaft 20 passes through opening 18 with little or no resistance and enters cavity 19. The driver then rotates sheet 11 around shaft 13 upward to the park position. Circular portions 21 engage with the inside of cavity 19 and cause it to expand through flexure. Cavity 19 holds shaft 20 with frictional force to keep sheet 11 in its park position.

Therefore, the invention allows moving sheet 11 to side window and returning it back to park position with minor effort and attention which eliminates driver distraction and improves driving safety.

The basic principle of the invention is providing a cross section for shaft 20 that has a smaller dimension in one direction and a larger dimension in another direction compared to opening 18 of receptacle 17. Therefore, receptacle 17 firmly grips and holds shaft 20 except for a small range of angular orientation, when sheet 11 is away from its park position, to allow release of shaft 20 out of or into opening 18.

Figure 4:
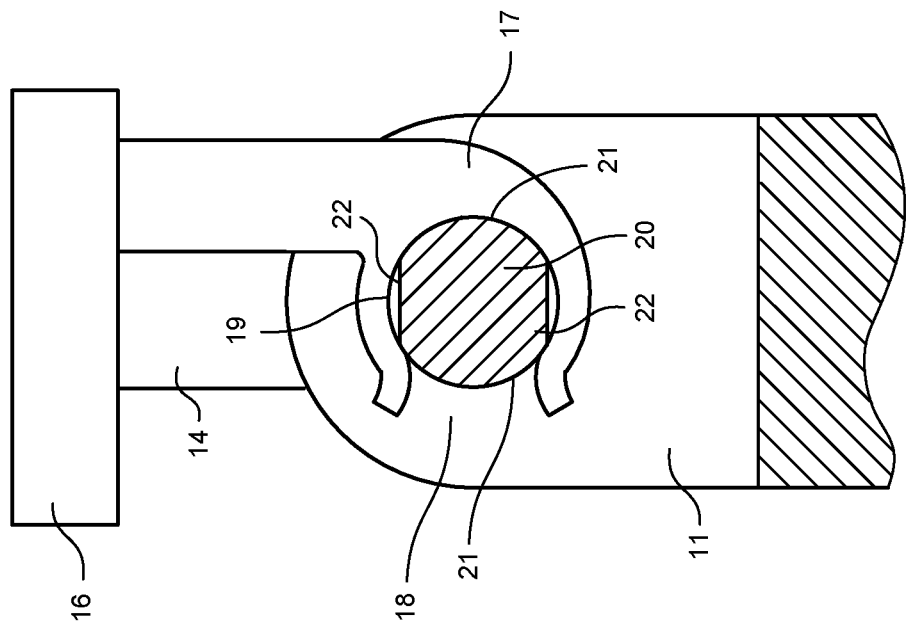
FIG. 4 shows a sectional side view of the second preferred embodiment of the invention.

In the second embodiment of the invention, FIG. 4, Opening 18 is slightly smaller than the dimension across flat portion 22. This embodiment works similar to the first embodiment. However, cylindrical portion 21 stays slightly engaged with cavity 19 when sheet 11 is in vertical position. There would be some resistance from opening 18 when pulling shaft 20 out of cavity 19, but smaller than when portion 21 is fully engaged with receptacle 17.

Some existing receptacle designs use a rigid receptacle 17 and provide the flexure for snap action and gripping of shaft 20 with one or two cantilever springs. The invention also applies to this design approach with any form of flexing mechanism.

I claim:

1. A car visor with reduced handling force for safe and comfortable maneuvering between windshield and side window positioning, the car visor has a light blocking visor sheet attached rotatably to a horizontal shaft, one end of the horizontal shaft has a vertical leg secured rotatably above the windshield of the car, an end shaft is fixed to the visor sheet at the other end of the horizontal shaft and coaxial with it, a receptacle with an opening attached above the windshield receives and holds the end shaft with flexure force, frictional forces keep the visor at any orientation and location imparted by the driver, the end shaft has larger thickness in one radial direction and smaller thickness in another radial direction, when the visor sheet is rotated to near vertical orientation, the flexure force of the receptacle is against the thinner side of the end shaft, allowing the shaft to be pulled out of or pushed into the receptacle with less force compared to other visor sheet orientations where the flexure force of the receptacle is against the thicker side of the end shaft.

2. The car visor of claim 1 wherein the thicker side of the end shaft is cylindrical.

3. The car visor of claim 1 wherein the thinner side of the end shaft is flat.

4. The car visor of claim 1 wherein the thickness of the thinner side of the end shaft is smaller than the opening of the receptacle.

5. The car visor of claim 1 wherein the thicker and the thinner sides of the end shaft are positioned at perpendicular radial orientations.

* * * * *